United States Patent [19]

Dirmeyer et al.

[11] Patent Number: 4,564,260

[45] Date of Patent: Jan. 14, 1986

[54] OPTICAL WAVEGUIDE BRANCHING UNIT AND METHOD OF MAKING SAME

[75] Inventors: Josef Dirmeyer; Norbert Odemar; Gerhard Winzer, all of Munich, Fed. Rep. of Germany

[73] Assignee: Siemens Aktiengesellschaft, Berlin & Munich, Fed. Rep. of Germany

[21] Appl. No.: 148,730

[22] Filed: May 12, 1980

[30] Foreign Application Priority Data

May 23, 1979 [DE] Fed. Rep. of Germany ....... 2921035

[51] Int. Cl.⁴ .......................... G02B 7/26; G02B 5/14
[52] U.S. Cl. ............................... 350/96.16; 350/96.20; 350/96.21
[58] Field of Search ............... 350/96.15, 96.16, 96.18, 350/96.20, 96.21, 96.22

[56] References Cited

U.S. PATENT DOCUMENTS

| | | | |
|---|---|---|---|
| 3,689,264 | 9/1972 | Chandross et al. | 350/96.15 |
| 3,874,779 | 4/1975 | Thiel | 350/96.16 |
| 4,072,399 | 2/1978 | Love | 350/96.16 |
| 4,136,929 | 1/1979 | Suzaki | 350/96.15 |
| 4,200,356 | 4/1980 | Hawkes et al. | 360/96.16 |
| 4,245,884 | 1/1981 | Magura et al. | 350/96.16 |
| 4,310,217 | 1/1982 | de Mendez et al. | 350/96.16 |

*Primary Examiner*—William L. Sikes
*Assistant Examiner*—Frank González
*Attorney, Agent, or Firm*—Hill, Van Santen, Steadman & Simpson

[57] ABSTRACT

An optical branching unit and method for producing the unit which comprises an optical branching element having a body portion with at least one surface having the waveguides extending thereto, said surface and the waveguides being polished optically flat to extend perpendicular to the longitudinal axis of the waveguides, each of the units being secured in a housing, which has a port associated with each optical waveguide and a device for receiving and holding an external waveguide being axially aligned with the axis of each optical waveguide so that an external waveguide can be held in an abutting and aligned contact with the polished optical waveguide of the polished optical flat surface to form an optical waveguide communication with the waveguide of the branch element.

9 Claims, 7 Drawing Figures

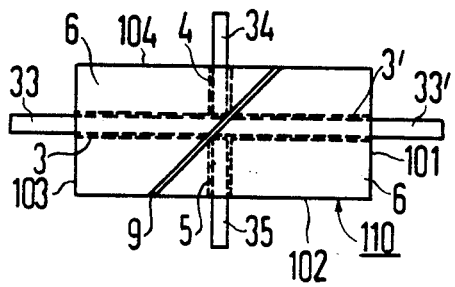
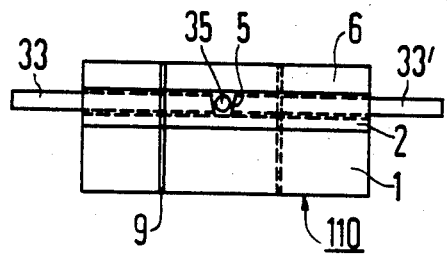
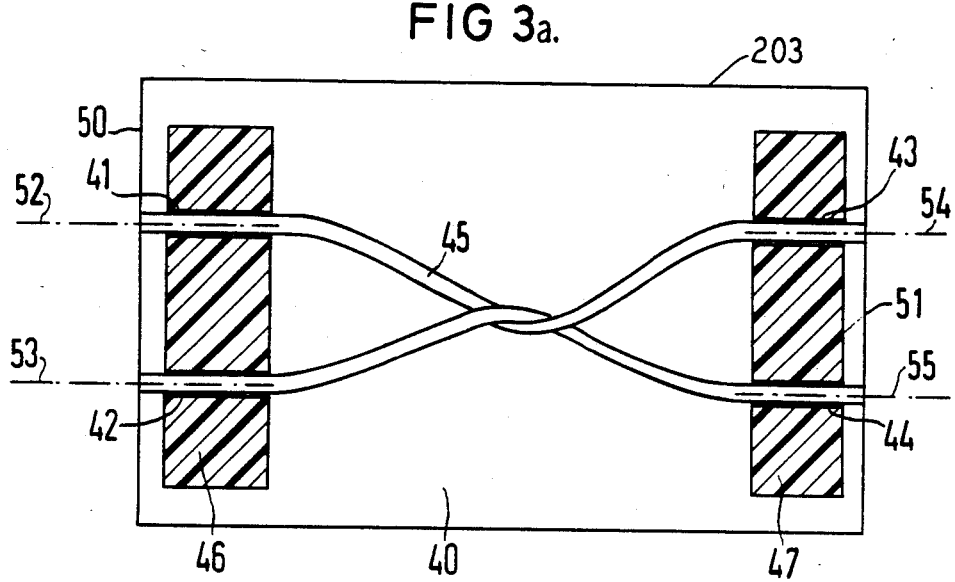
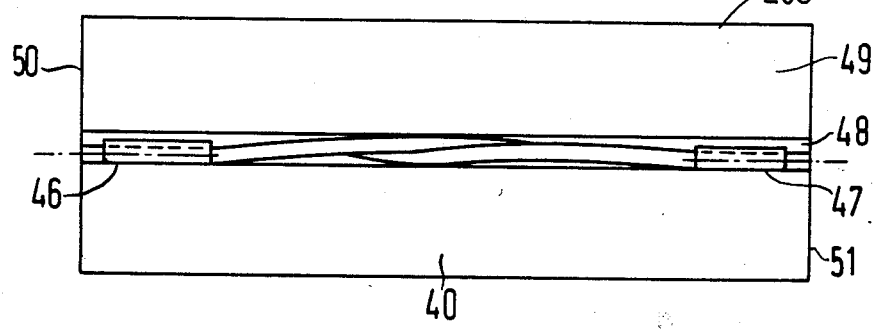

OPTICAL WAVEGUIDE BRANCHING UNIT AND METHOD OF MAKING SAME

BACKGROUND OF THE INVENTION

This invention relates to an optical waveguide branching unit and method of making such a unit, which unit has an optically interconnected light waveguide arrangement to which external waveguides are to be connected so as to be in optical waveguide communication with the waveguides of the branching unit.

Branching units which may operate, for example, in accordance with the displacement principle, are disclosed in an article in *Applied Optics* Vol. 16, 1977, pages 2195–2197. Branching waveguide arrangements comprising convergent, fused optical fibers are disclosed in an article in *Applied Optics* Vol. 16, 1977, pages 1794 to 1795. A branching unit, which operates in accordance with the beam divider principle, has been disclosed in copending U.S. patent application Ser. No. 093,519, filed Nov. 13, 1979, which issued as U.S. Pat. No. 4,317,699 and was based on German Application P No. 28 51 679.

In all these branching units the light waveguides project laterally from a body portion, which portion basically consists of a substrate carrying the waveguide arrangement and a cover. These light waveguide ends are positioned and fixed by means of adhesive in sockets secured to an associated housing. This mounting arrangement involves an extremely labor-intensive procedure. External light waveguide cables can be connected to these sockets by means of matching plugs so as to establish optical communication between the external light waveguide cables and the waveguides of the branching units.

SUMMARY OF THE INVENTION

It is an object of the present invention to provide a branching unit, which enables a simplification of the connections to external light waveguide cables or other light waveguide modules.

To accomplish these objects, the present invention is directed to an optical waveguide branching unit having a housing containing a branching element, said branching element comprising a body portion having an arrangement of optical interconnected waveguides extending to at least one surfaces of the body portion, said surfaces of the body portion having a waveguide extending thereto and the waveguide end being polished to be in an optically flat surface extending perpendicular to the longitudinal axis of the waveguide associated therewith, said housing having a port adjacent each of the waveguides of the branching elements and having means for receiving and securing external optical waveguides in axial alignment with each of the optical waveguides of the branching element so that an external waveguide can be received and secured in abutting contact with the polished optical flat surface and axially aligned with the waveguide of the branching element to form an optical waveguide communication therewith.

Preferably, each of the means for receiving and securing comprises a flanged boss having a socket for receiving an external waveguide cable. Preferably, the external waveguide cables have a plug arrangement which is received in the socket and which has internal threads for being threadably received on external threads of the flanged boss.

The branching elements can be constructed in accordance with a displacement principal or can comprise tapering fused light waveguides which will have two waveguides extending to two opposite parallel surfaces. In addition, the branching element can be constructed in accordance to a beam divider principal having at least three side surfaces with optical waveguides with the two surfaces being parallel to each other and the third surface being polished to be perpendicular to the two parallel surfaces.

To form the branching unit, the invention utilizes a method comprising the steps of forming a branching element by providing an arrangement of optically interconnected optical waveguides in a body portion having waveguides extending from at least one surface of the portion, polishing each surface of the body portion having a waveguide extending therefrom and the waveguide to be in an optically flat surface which extends perpendicular to the longitudinal axis of the waveguide, providing a housing having a port for each of the optical waveguides of the arrangement, securing the branching element in said housing with a port being aligned with each waveguide, positioning means for receiving and securing an external optical waveguide at each port with the axis of said means for receiving and securing being aligned with the optical waveguide associated with said port, securing said means in said aligned position so that an external optical waveguide received in the means for receiving and securing will be held in abutting contact with the polished optical flat surface of the waveguide of the arrangement and in alignment therewith to be in an optical waveguide communication with the waveguide of the branching element.

It should be remembered, that a decisive factor of the present invention is that the light waveguide of the branching element should be fixed in a body, whose optical flat surfaces following the polishing of the surface are comparable with the end surface of a light waveguide plug.

BRIEF DESCRIPTION OF THE DRAWINGS

FIGS. 1a and 1b are views of a branching element prior to polishing the element in accordance with the present invention with FIG. 1a being a plan view of the branching element and FIG. 1b being a side view;

FIGS. 3a and 3b are views of a branching element comprising convergent fused light waveguides with FIG. 3a being a cross-sectional view with portions in elevation, and FIG. 3b being a side view of the branching element of FIG. 3a;

FIG. 3c is an enlarged view of the point of connection of the convergent fused light waveguide of FIG. 3a.

DESCRIPTION OF THE PREFERRED EMBODIMENTS

Figure 2:
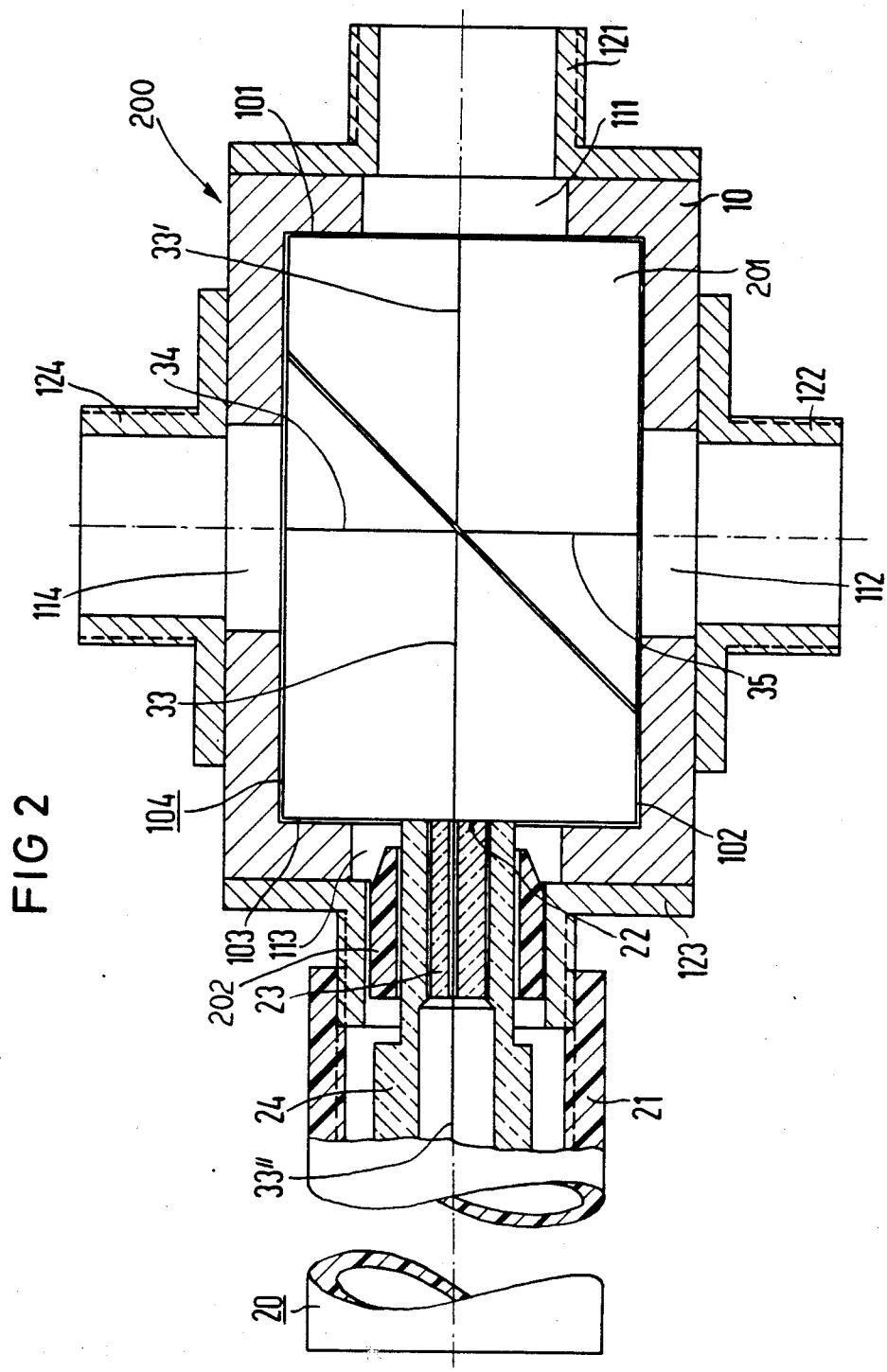
FIG. 2 is a cross-sectional view of a branching unit in accordance with the present invention.

The principles of the present invention are particularly useful in a branching unit generally indicated at 200 in FIG. 2 which includes a housing 10 receiving a branching element 201.

To form the branching element 201, the present invention utilizes a body portion 110, as illustrated in FIGS. 1a and 1b. As illustrated, the body portion 110 is formed of a substrate 1 having a silicon plate 2 secured thereto by means of cementing. In the silicon plate 2, guide channels 3 and 3' as well as guide channels 4 and 5 are provided. It should be noted that the guide channels 4 and 5 have an axes which extend perpendicular to the axis of the channels 3 and 3', which axes are aligned. The channel 3 receives a waveguide 33 and the channel 3' receives a waveguide 33' whose end faces are separated by a partially transmissive and reflective layer 9 that extends at 45° to the axis of the two waveguides 33 and 33'. The channel 4 receives a waveguide 34 which is in contact with a portion of the channel 33 and whose axis intersects the aligned axes of the waveguides 33 and 33' in the layer 9. In a similar manner, the channel 5 has a waveguide 35, which engages the waveguide 33' and has an axis that is aligned with the axis of the waveguide 34 and intersects the aligned axes of waveguides 33 and 33' in the layer 9. A cover 6 (FIG. 1b) closes the various grooves containing their waveguides and is preferably a glass cover of the same refractive index and hardness as the waveguides.

As illustrated, each of the waveguides 33, 33', 34 and 35 extend past the end surfaces of the body portion 110, which surfaces are 101, 102, 103 and 104. In order to form the branching element 201 of FIG. 2, each of the portions of the waveguides extending beyond the end surfaces are removed and each of the end surfaces such as 101, 102, 103, 104, and the respective waveguides are polished to be in optically flat surfaces which extend perpendicular or orthogonal to the longitudinal axis of the respective waveguide. Thus, the surface such as 102 and the end of the waveguide 35 lie in the same plane, which extends perpendicular to the axis of the waveguide 35, and each of the end surfaces of the waveguides of 33, 33', 34 and 35 form part of the polished surfaces in a similar fashion to the end surfaces of a light waveguide in conventional light waveguide sockets. Thus, the polished surfaces 101-104 directly replace socket end surfaces.

The branching element 201 is now permanently secured to a base of a housing 10 for example by means of an adhesive. The housing 10 has ports 111, 112, 113, and 114 which are aligned with each of the waveguides as illustrated in FIG. 2. Flanged bosses 121-124, which form means for receiving and securing external waveguide plugs, are positioned at each of the ports 111-114 with each of the bosses having a bore that is axially aligned with the respective waveguides so that a boss such as 121 is axially aligned with the waveguide 33'. After the step of positioning the bosses to be in alignment, the bosses are permanently joined to the housing 10. The bore of each of these bosses forms means for receiving the external waveguide and forms a conventional light waveguide socket.

As best illustrated with respect to the flanged boss 123, an external light waveguide plug arrangement 20 can be introduced in a known manner into the socket of the flange 123 with a snug fit. As illustrated, the plug arrangement 20 has an external sleeve 21, which is provided with internal threads for being threadably received on external threads of the boss 123. The plug arrangement 20 has a waveguide 33", which is received in a capillary 23, which in turn is received in a capillary holder 24. The end surfaces of the waveguide 33", the capillary 23 and the capillary holder 24 are polished flat to form a polished end surface 22. When the plug 20 is inserted into the boss 123, the flat surface 22 is pressed into an abutting contact with the end surface 103 of the branching element 201 so that an optical waveguide communication is created between the waveguide 33 and the waveguide 33". As illustrated, a sleeve or bushing 202 is telescopically arranged between the internal surface of the boss 123 and the exterior surface of the holder 24. The assembly of the plug can take place with or without the aid of an immersion fluid. While not illustrated, other external waveguides can be connected in a similar manner to the flanged bosses 121, 122, and 124.

Figure 3C:
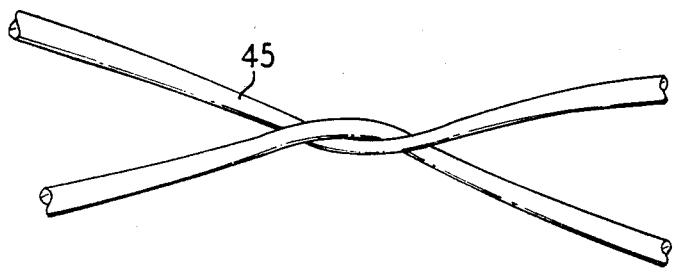

While the branching unit of FIG. 2 is illustrated using a branching element which operates in accordance with the beam divider prinicple, the unit is not limited to this type of branch element. For example, the branching element can be a branching unit 203 illustrated in FIGS. 3a and 3b. As illustrated, the element 203 has a base substrate 40, which on an upper surface has a pair of light sensitive thick film strips 46 and 47 which have been exposed and developed to form parallel extending guide grooves 41 and 42 in the strip 46 and parallel grooves 43 and 44 in the strip 47. The guide grooves 41-44 receive a fused light waveguide arrangement 45. While the illustrated embodiment shows the grooves being formed in the thick film 46 and 47, they can also be impressed into the base substrate 40 itself. The base substrate 40 is covered by means of a cover 49 using an adhesive 48 as illustrated in FIG. 3b. The end surfaces 50 and 51 of the unit 203 have been polished to be optically flat and as illustrated to extend perpendicular to the portion of the fused waveguide arrangement 45 in the grooves such as 41 and 42. As in the previous embodiment, the ends of each of the waveguides lie in the optical flat surface with the difference being that two waveguides are in the plane of the surface 50 and two waveguide ends are in the plane of the waveguide 51. A second deviation from the embodiment of FIG. 2 is that the housing for the branch element will be provided at positions 52, 53, 54 and 55 with ports and the aligned flanged bosses whose inner bores provide means for receiving and securing external waveguide plugs in axial alignment with the waveguides in the grooves 41 and 42.

In the embodiment of the branching element 203 of FIGS. 3a and 3b, it is advantageous for the base substrate 40 and the cover 49 to consist of glass possessing the same degree of hardness as that of the light waveguides 45. In the case of a plug connection which need not be released to frequently, casting resins can be used for securing the plug to the unit.

Figure 4:
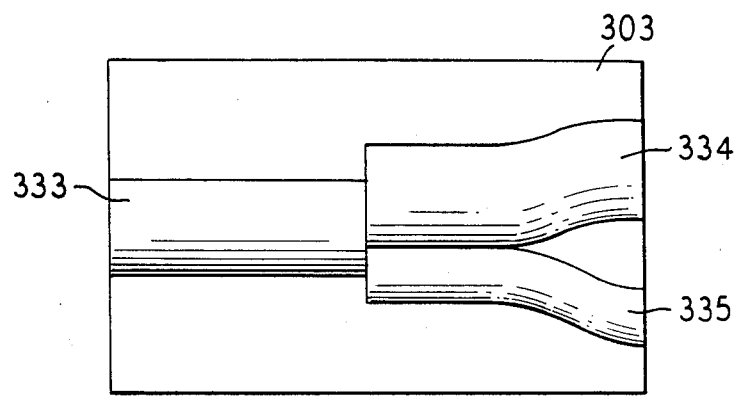
FIG. 4 is a plan view of a branching waveguide element constructed in accordance with the displacement principle.

In FIG. 4, a branching waveguide element 303 is constructed in accordance with the displacement principle as mentioned in *Applied Physics*, Vol. 16, 1977, pp. 2195-2197. The element 303 has one fiber or waveguide 333 with a portion of its end face covered by fibers or waveguides 334 and 335 so that information in the waveguide 333 will be coupled into both waveguides 334 and 335. The amount of light coupled from the fiber or waveguide 333 into each of the waveguides 334 and 335 will depend on the amount of lateral displacement or offset between the axis of the waveguides. As in the previous embodiments, the unit 303 is received in a housing which has a port for each waveguide.

The invention is not limited to individual branching elements illustrated in the two embodiments. It can also be used for a particular advantage for a multiple branching element wherein a plurality of individual branching elements are arranged in layers one upon the other to form a parallelepiped.

The embodiment described above dispenses with the need for threading the light waveguides of the branching elements into glass capallaries, fixing or securing the glass capillaries in capillary holders of a socket, and the work which is required to complete each of the sockets. For example, polishing the outer end surface of each socket to be optically flat. The present invention only requires positioning and securing the flanged bosses in the desired alignment with each of the waveguides to accommodate the external waveguide plugs.

Although various minor modifications may be suggested by those versed in the art, it should be understood that we wish to embody within the scope of the patent granted hereon, all such modifications as reasonably and properly come within the scope of our contribution to the art.

We claim:

1. An optical waveguide branching unit comprising a housing, and a branching element being secured in said housing, said branching element comprising a body portion of a cover member and substrate containing an arrangement of optically interconnected waveguides between the substrate and cover member, each waveguide in said arrangement extending between at least two different surfaces of the body portion, each of said different surfaces of the body portion being polished and forming an optically flat surface extending in a plane perpendicular to the longitudinal axis of the waveguide associated therewith, each of the waveguides associated with each of said surfaces having waveguide end surfaces polished to be optically flat end surfaces terminating in the plane of the polished surface of the body portion, said housing having a planar port directly adjacent and abutting each of the polished end surfaces of the waveguides of the branching element with no intervening mechanical structure and having means for receiving and securing external optical waveguides in axial alignment with each of the optical waveguides of the branching element so that an external waveguide received and secured in each port is in direct planar abutting contact with the polished optical flat waveguide end surface lying in the plane of the polished surface of the body portion and aligned with the waveguide of the branching element to form an optical waveguide communication therewith.

2. An optical waveguide branching unit according to claim 1, wherein each of the means for receiving and securing comprises a flanged boss having a socket for receiving an external waveguide cable.

3. An optical waveguide branching unit according to claim 2, wherein each of the external waveguides have an end plug arrangement for being received in the socket of the flanged boss, said flanged boss having external threads for threadably receiving internal threads on the plug arrangement of the external waveguides.

4. An optical waveguide branching unit according to claim 1, wherein the branching element waveguide arrangement is constructed in accordance with a beam divider principle having at least three polished surfaces with an optical waveguide.

5. An optical waveguide branching unit according to claim 1, wherein the waveguide arrangement of the branching element has at least one waveguide with an interior face engaging the interior faces of two other waveguides within said body portion, the combination of engaged waveguides extending between opposite polished surfaces of the body portion.

6. A method of making an optical waveguide branching unit comprising the steps of forming a branching element by providing an arrangement of optically interconnected optical waveguides in a substrate, a body portion of said branching element with each of the optical waveguides of the arrangement extending between at least two different surfaces of the body portion, covering said body portion with a cover to structurally complete said branching element, polishing each surface of the branching element having a waveguide extending therefrom and simultaneously polishing the ends of each of the waveguides associated therewith thereby forming an optically flat surface which extends in a plane perpendicular to the longitudinal axis of the waveguide and with each polished waveguide end terminating in the plane, providing a housing having a port for each of the optical waveguides of the arrangement, securing the branching element in said housing with a port being in direct planar abutment aligned with each polished waveguide end surface, positioning means for receiving and securing an external optical waveguide at each port with the axis of said means for receiving and securing being aligned with the optical waveguide associated with said port, and securing said means in said aligned position so that an external optical waveguide received in the means for receiving and securing will be held in an aligned and directly abutting contact with the polished optical flat waveguide end surface lying in the plane of the polished surface of the body portion of the arrangement to be in an optical communication with the waveguide of the branching element.

7. A method according to claim 6, wherein the means for receiving and securing comprises a flanged boss having a waveguide receiving socket with a longitudinal axis aligned with the respective longitudinal axis of the waveguide of the branching element.

8. A method according to claim 6, wherein the branch element comprises a branch element utilizing a beam divider principle having at least three waveguides extending from at least three surfaces with said step of polishing the surfaces of the body portion polishing two of the surfaces to be parallel to each other and perpendicular to at least the third surface.

9. A method according to claim 6, wherein said branching element comprises said substrate having means forming two sets of parallel extending grooves receiving waveguides, said waveguides in said grooves extending from two opposite surfaces of said substrate, and wherein said step of polishing the optically flat surfaces polishes two surfaces to be optically flat and perpendicular to the pair of waveguides extending therefrom.

* * * * *